G. WILLIAMSON.
APPARATUS FOR CENTERING SHAFTS AND THE LIKE.
APPLICATION FILED MAR. 29, 1910.

979,909.

Patented Dec. 27, 1910.

2 SHEETS—SHEET 1.

Witnesses
Mary W. Hammer
Albert Popkins

Inventor
George Williamson
By Sturtevant & Mason
Attorneys

G. WILLIAMSON.
APPARATUS FOR CENTERING SHAFTS AND THE LIKE.
APPLICATION FILED MAR. 29, 1910.
979,909.
Patented Dec. 27, 1910.
2 SHEETS—SHEET 2.
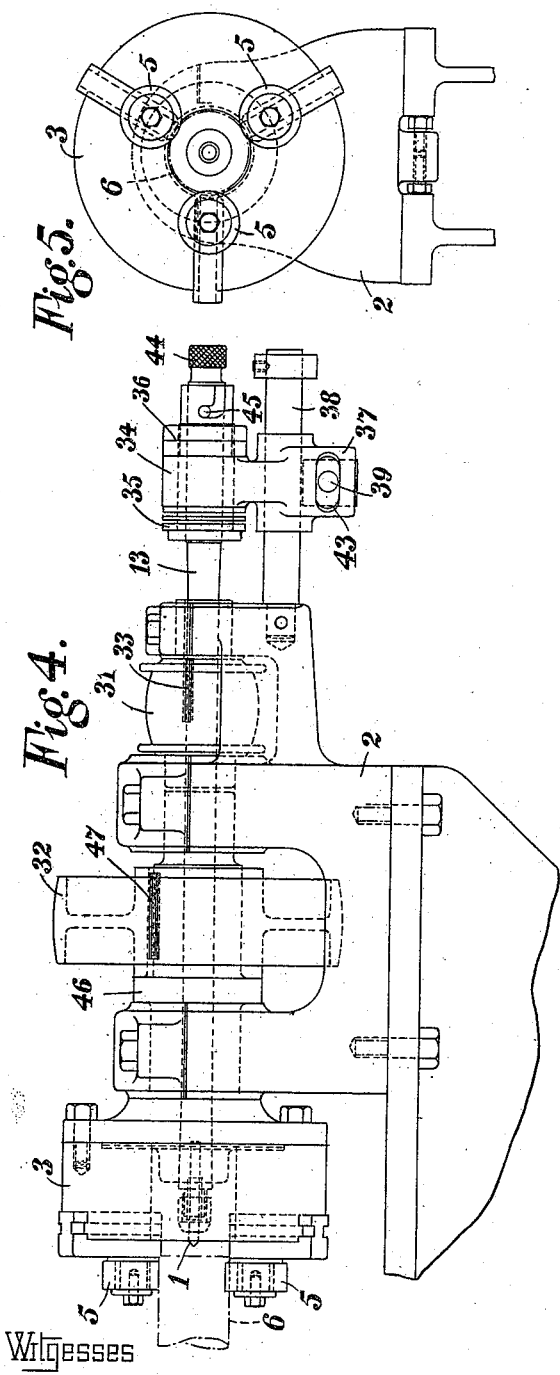
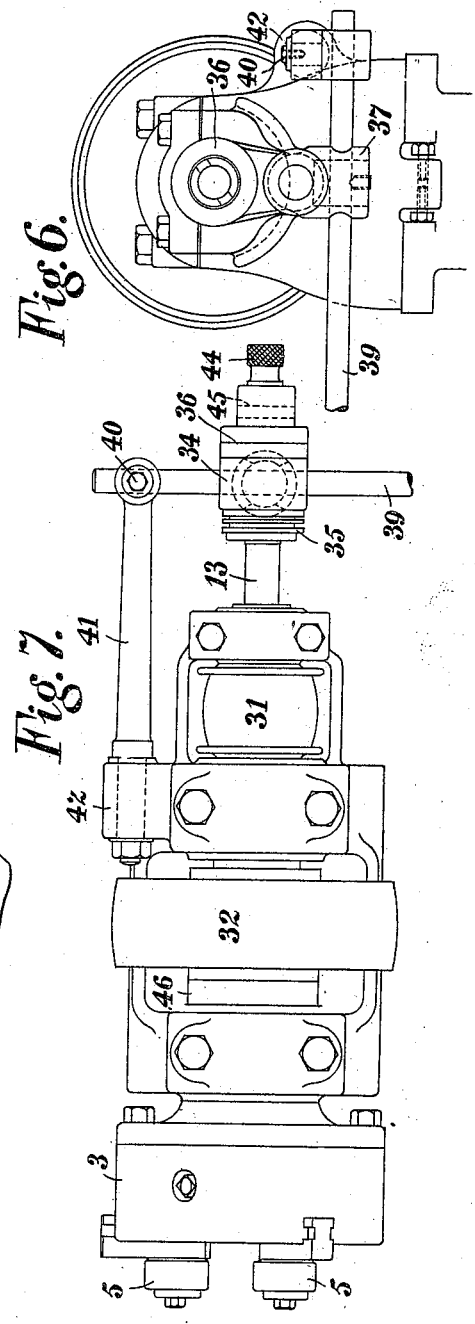
Witnesses
Mary W. Hammer
Albert Poplens
Inventor
George Williamson
By Sturtevant & Mason
Attorneys

UNITED STATES PATENT OFFICE.

GEORGE WILLIAMSON, OF ROCHDALE, ENGLAND.

APPARATUS FOR CENTERING SHAFTS AND THE LIKE.

979,909.  Specification of Letters Patent.  Patented Dec. 27, 1910.

Application filed March 29, 1910. Serial No. 552,144.

*To all whom it may concern:*

Be it known that I, GEORGE WILLIAMSON, a subject of the King of Great Britain, residing in Rochdale, in the county of Lancaster, in the Kingdom of England, have invented certain new and useful Improvements in Apparatus for Centering Shafts and the Like, of which the following is a specification.

This invention relates to the centering of turned shafts and the like. As is well known this operation is one that requires extreme accuracy and has usually been performed by methods requiring hand adjustment, depending very largely upon the skill of the operator for their success.

It is the object of the present invention to provide an apparatus by which the centering may be performed to the necessary degree of accuracy with the minimum amount of manipulation and skill on the part of the operator.

Figure 2:
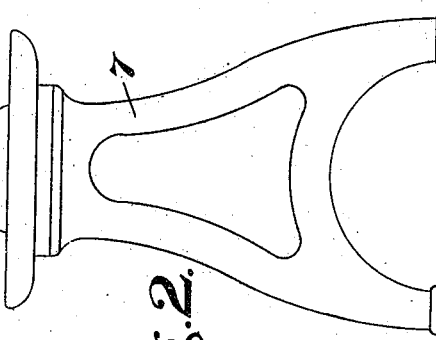
Figure 1:
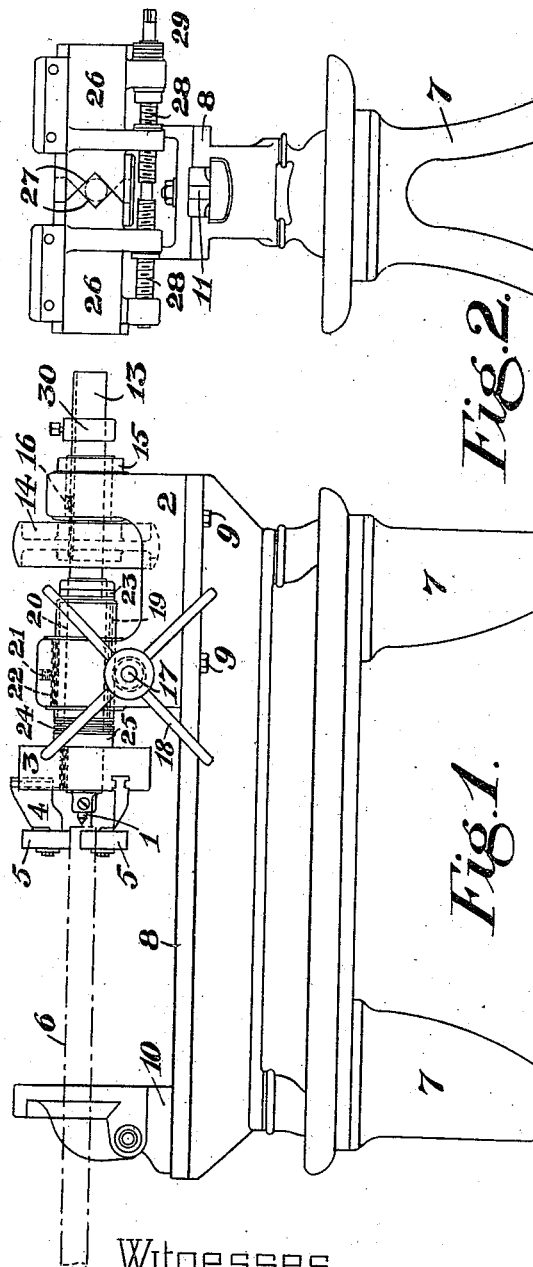

The invention will be described with reference to the accompanying drawings in which;

Figure 1 is a side elevation; Fig. 2 an end elevation; and Fig. 3, a plan of a machine designed for working according to this invention; Fig. 4 is an enlarged side elevation of a modified construction of the head of the machine; Figs. 5 and 6 are end views respectively of this device seen from opposite ends; and Fig. 7 is a plan thereof.

In carrying out the invention a center cutter 1 is mounted in a support in the form of a head-stock 2 and a universal chuck 3 is mounted so that its jaws 4 surround the cutter. These jaws are not formed so as to have a gripping action but are provided with rollers 5 rotatably mounted on their ends. These rollers lie a short distance in front of the cutter 1 so that the end of the shaft to be centered may be placed between them. After this has been effected the chuck is adjusted so that the rollers 5 bear firmly upon the shaft. The rollers 5 and cutter 1 are then rotated by suitable means and the cutter is fed up to the end of the shaft. If the rollers 5 are arranged exactly equi-distant from the cutter axis, the cutter will of course be exactly opposite the center of the shaft and accordingly will mark out the center by boring a conical recess therein. If, however, as is practically always the case the rollers 5 are not exactly equi-distant from the cutter axis, the center line of the shaft will be slightly eccentric to the cutter and as the rollers roll around the shaft the end of the latter will be caused to swing in a small circle so that the cutter will then describe a circle of small radius about the center of the shaft so that the centering will be accurately effected.

Figure 3:
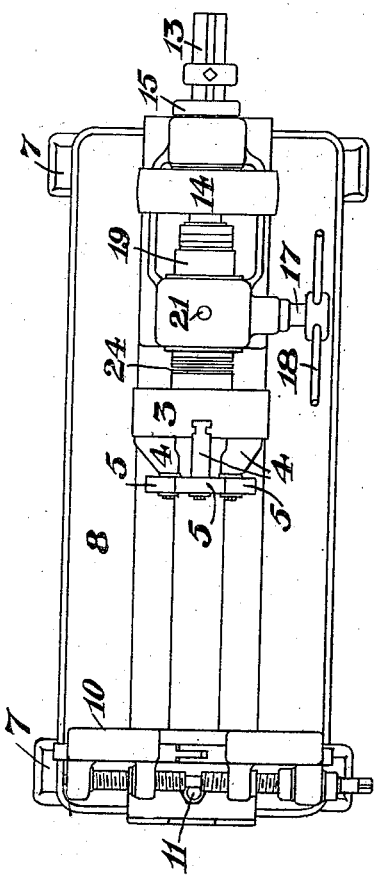

Apparatus for carrying out the invention will now be described, reference being first made to the forms shown in Figs. 1 to 3. The shaft to be centered is indicated by 6 and is shown in chain dotted lines in Fig. 1 (it is also similarly shown in Fig. 4). 7 is the stand or support for the machine and 8 is the bed thereof on which the headstock 2 is mounted, being secured in position as by means of bolts and nuts 9. 10 is an adjustable rest or holder for the shaft 6 this holder being locked in any position required on the bed 8, as by means of bolt 11 (Figs. 2 and 3). The center cutter 1 is carried in the head stock 2 by means of the spindle 13 adapted to be rotated by means of a pulley 14 driven by a belt from a suitable counter shaft. This pulley 14 is mounted on a sleeve 15 which by means of a feather 16 engages the spindle 13 in such a way that the sleeve 15 is rotatably supported in the right hand part of the head-stock 2 so that it cannot move longitudinally. The feather 16 allows the spindle 13 to slide through the sleeve 15 so as to feed forward the cutter 1. This feed is effected by means of the shaft 17 mounted transversely in the left hand part of the head-stock 2 and adapted to be turned by means of a handle 18. This shaft carries a pinion engaging with a rack 19 on a sleeve 20 which is mounted in the left hand part of the head-stock 2 so that it can slide longitudinally while being prevented from rotating by a screw or pin 21 engaging in a longitudinal groove 22 in the sleeve. This sleeve 20 embraces the left hand end of the cutter spindle 13 and abuts at one end against thrust collars or nuts 23 on the spindle while at the other end it works against a ball thrust collar 24 which in turn works against a boss 25 on the cutter spindle; hence when the handle 18 is turned it will move the sleeve 20 longitudinally while permitting it to rotate. On the end of the cutter 1 is fixed the universal chuck 3 having three or more rollers or equivalent anti-friction devices 5 adapted to work around the end of the shaft 6 to be centered. With the exception of the formation of the jaws as described the chuck may be of any kind that will permit of the adjustment of the jaws being readily effected. The support or holder 10 for the shaft is provided with two laterally adjustable blocks 26 having interengaging V-shaped notches at 27. The two blocks 26 are adapted to be drawn together or moved apart by a right and left handed screw 28 adapted to be rotated by means of a handle applied to the end 29. It will be seen that with this device the shaft may be clamped and automatically held in the right axial position for centering by means of the notches 27.

In the machine above described the cutter 1 and chuck 3 are rotated and fed forward together since they are both mounted firmly on the spindle 13. A stop 30 is provided near the right hand end of the spindle to limit the forward feed of the cutter.

In some cases it is desirable to allow the rotation of the cutter to be independent of the rotation of the chuck, this being particularly desirable when dealing with large shafts when the rollers 5 would have a large distance to travel in each revolution. Figs. 4, 5 and 6 illustrate a modified form of the machine in which this is provided for. In this case the headstock 2 is of slightly modified construction, provision being made for the mounting of two pulleys 31 and 32, the former of which drives the spindle 13 and the cutter 1 while the latter drives the chuck 3 carrying the rollers 5. The pulley 31 engages the spindle 13 by means of a feather 33 so that, as in the previously described machine, the pulley may drive the spindle continuously while it is being fed forward without partaking of its axial motion. A lever feed for the spindle is in this case provided instead of the rack and pinion device. A collar 34 mounted between thrust collars 35 and 36 near the end of the spindle 13 has a downwardly projecting lug 37 which embraces a pin 38 fixed in the end of the headstock 2. A lever 39 is pivoted at 40 on an arm 41 which is bolted to a boss 42 on the headstock 2 (Figs. 6 and 7), and this lever passes through a slot 43 in the lower part of the lug 37. By moving the lever 39 the lug 37 with the collar 34 is moved to the right or left feeding up the cutter spindle 13 or withdrawing it. A well known form of devise consisting of a milled head 44 carrying a pin 45 engaging in a bayonet slot allows the thrust block 5 to be detached when required. The chuck 3 is in this case mounted on a sleeve 46 on which the pulley 32 is secured by means of a key 47. It will be seen that in this form of the machine the spindle can be fed forward while the chuck only has rotary motion and further, the speed of rotation of the chuck is quite independent of that of the cutter.

Further modifications of the device might evidently be introduced if required, for example, the whole of the headstock 2 might be fed forward or any other equivalent mechanism might be used which would secure the required relative longitudinal movement between the cutter and the shaft. Of course also instead of a hand feed for the cutter any suitable form of automatic feed might be used. Evidently the universal chuck might have four or more jaws each provided with a roller and other details might be modified. Instead of the pair of laterally adjustable holding blocks 26, a vertical adjustable block with a V-notch at its upper end might be used in conjunction with means for clamping the shaft in the notch.

I declare that what I claim is:—

1. Apparatus for centering shafts and the like, comprising means for holding the shaft, a headstock, a cutter for marking the center carried in said headstock, interconnected members grouped about the axis of said cutter and adapted to engage the periphery of the shaft adjacent the end thereof, means for rotating said group of members about the shaft and in contact with the surface thereof, said group of members and said rotating means being carried by said headstock, means for moving the cutter axially relative to said headstock.

2. Apparatus for centering shafts and the like, comprising means for holding the shaft, a headstock, a cutter for marking the center carried in said headstock, interconnected members grouped about the axis of said cutter and adapted to engage the periphery of the shaft adjacent the end thereof, means for rotating said group of members about the shaft and in contact with the surface thereof, said group of members and said rotating means being carried by said headstock, means for moving the cutter axially relative to said headstock and to said group of members.

3. Apparatus for centering shafts and the like comprising means for holding the shaft, a cutter for marking the center, interconnected members grouped about the axis of said cutter and adapted to engage the periphery of the shaft adjacent the end thereof, means for rotating said group of members about the shaft and in contact with the surface thereof, and means for moving the cutter axially relative to and independently of the said group of members.

4. Apparatus for centering shafts and the like, comprising means for holding the shaft, a cutter for marking the center, interconnected members grouped about said cutter axis and adapted to engage the periphery of the shaft near the end thereof, means for rotating said group of members about the shaft and in contact with the surface thereof, independent means for rotating the cutter and means for bringing the cutter into contact with the end of the shaft.

5. Apparatus for centering shafts and the like comprising means for holding the shaft, a cutter for marking the center, interconnected members grouped about the axis of said cutter and adapted to engage the periphery of the shaft near the end thereof, means for rigidly supporting said cutter and said group of members, means for rotating said group of members about the shaft and in contact with the surface thereof, independent means for rotating the cutter and means for moving said cutter axially relative to the support and independently of said group of members.

6. Apparatus for centering shafts and the like, comprising means for holding the shaft, a cutter for marking the center, a spindle carrying said cutter, a rigid support in which said spindle is rotatably mounted, interconected members grouped about the axis of said cutter in one plane and adapted to engage the periphery of the shaft adjacent the end thereof, means for rotating said group of members about the shaft and in contact with the surface thereof, said group of members being carried by the support in which the cutter spindle is mounted, means for producing relative axial movement between the shaft and cutter.

7. Apparatus for centering shafts and the like, comprising means for holding the shaft, a headstock, a cutter for marking the center, a spindle carrying said cutter, a sleeve surrounding said spindle and mounted in said headstock a driving pulley mounted on said sleeve, means for connecting said sleeve and spindle together for rotary movement, means for moving said spindle axially relative to said sleeve, a second sleeve surrounding said first sleeve, a driving pulley on said second sleeve, an annular frame mounted on the end of said second sleeve adjacent the cutter, and rollers mounted in said frame and adapted to surround the end of the shaft and bear upon the periphery thereof.

8. Apparatus for centering shafts and the like, comprising means for holding the shaft, a headstock a cutter for marking the center, a spindle carrying said cutter, said spindle being rotatably mounted in said headstock, means for rotating said spindle, means for producing relative axial movement between the shaft and cutter, a three-jaw chuck mounted in said headstock coaxial with said cutter, a roller mounted in each of the jaws of the chuck and adapted to engage the periphery of the shaft adjacent the end thereof, and means for rotating said chuck.

In witness whereof, I have hereunto signed my name this 17th day of March 1910, in the presence of two subscribing witnesses.

GEORGE WILLIAMSON.

Witnesses:
   HUBERT A. GILL,
   RICHD. L. CLEAVER.